United States Patent
Liu

(10) Patent No.: US 8,107,889 B2
(45) Date of Patent: *Jan. 31, 2012

(54) TRANSCEIVER DEVICE AND POWER SAVING METHOD THEREOF

(75) Inventor: Tsu-Chun Liu, Hsin-Chu (TW)

(73) Assignee: IC Plus Corp., Hsin-Chu (TW)

( * ) Notice: Subject to any disclaimer, the term of this patent is extended or adjusted under 35 U.S.C. 154(b) by 672 days.

This patent is subject to a terminal disclaimer.

(21) Appl. No.: 12/208,861

(22) Filed: Sep. 11, 2008

(65) Prior Publication Data

US 2010/0029217 A1  Feb. 4, 2010

(30) Foreign Application Priority Data

Jul. 30, 2008  (TW) ................. 97128855 A

(51) Int. Cl.
  *H04B 1/38* (2006.01)
(52) U.S. Cl. .............. 455/73; 455/127.1; 455/343.5
(58) Field of Classification Search ............ 455/73, 455/127.1, 343.5, 522, 571, 572, 573, 574
See application file for complete search history.

(56) References Cited

U.S. PATENT DOCUMENTS 6,341,224 B1 * 1/2002 Dohi et al. ............... 455/522
6,807,228 B2  10/2004 Agazzi et al.
7,778,609 B2 * 8/2010 Weng et al. ............... 455/69

FOREIGN PATENT DOCUMENTS

TW  I279994  4/2007

* cited by examiner

Primary Examiner — Tuan H Nguyen
(74) Attorney, Agent, or Firm — J.C. Patents

(57) ABSTRACT

A transceiver device and a power saving method thereof are provided. The transceiver device includes an attenuation estimation module, a transmitter, and a control module. The attenuation estimation module is coupled to a transmission path for estimating an attenuation value caused when a signal passes through the transmission path. The transmitter is coupled to the transmission path, for outputting a transmission signal. The control module is coupled to the attenuation estimation module and the transmitter. When the attenuation value is smaller than a default value, the output power of the transmitter is adjusted to be lower. Thereby, the power consumption of the transceiver device is decreased.

7 Claims, 4 Drawing Sheets

TRANSCEIVER DEVICE AND POWER SAVING METHOD THEREOF

CROSS-REFERENCE TO RELATED APPLICATION

This application claims the priority benefit of Taiwan application serial no. 97128855, filed on Jul. 30, 2008. The entirety of the above-mentioned patent application is hereby incorporated by reference herein and made a part of specification.

BACKGROUND OF THE INVENTION

1. Field of the Invention

The present invention generally relates to a transceiver device, in particular, to a power saving technique of a transceiver device.

2. Description of Related Art

In a communication system, usually a transceiver device is used to transmit signals. The transceiver device includes a transmitter (TX) and a receiver (RX). The transmitter is used to output signals, and the receiver is used to receive signals. Generally speaking, the output power adopted when the transmitter outputs a signal must comply with the standard prescribed by Institute of Electrical and Electronics Engineers (IEEE).

Therefore, in the prior art, when the transmitter of the transceiver device outputs a signal to the far-end device via a transmission path, even a distinct short length of the transmission path may not cause a severe signal decline, the transmitter still complies with the standard prescribed by IEEE, and outputs the signal at the output power prescribed by IEEE, thereby causing quite a large amount of power waste for the transmitter.

SUMMARY OF THE INVENTION

Accordingly, the present invention is directed to a transceiver device, so as to reduce the power consumption.

The present invention is directed to a power saving method of a transceiver device, so as to save power.

The present invention provides a transceiver device, which includes an attenuation estimation module, a transmitter, and a control module. The attenuation estimation module is coupled to a transmission path, for estimating an attenuation value caused when a signal passes through the transmission path. The transmitter is coupled to the transmission path, for outputting a transmission signal. The control module is coupled to the attenuation estimation module and the transmitter, for adjusting an output power of the transmitter to be lower when the attenuation value is smaller than a default value.

In an embodiment of the present invention, the transceiver device further includes a receiver. The receiver is coupled to the transmission path and the attenuation estimation module, for receiving an echo signal derived from the transmission signal. The attenuation estimation module may estimate the attenuation value based on the echo signal.

In an embodiment of the present invention, the transceiver device further includes a receiver. The receiver is coupled to the transmission path, for receiving a signal outputted from the far-end device through the transmission path. The attenuation estimation module calculates a parameter of the signal, and compares the parameter with an original parameter of the signal not passing through the transmission path, thereby estimating the attenuation value. In another embodiment, the parameter includes, for example, an intensity, a signal-to-noise ratio (SNR), a power, or a combination thereof, and the original parameter is corresponding to the above parameter.

In an embodiment of the present invention, the transceiver device further includes a timer and a receiver. The timer is used to time a period of time. The receiver is coupled to the transmission path, the timer, and the control module, for checking whether a confirmation signal outputted from the far-end device is received or not in the above period of time. The confirmation signal indicates that the far-end device can receive the transmission signal correctly. When the receiver does not receive the confirmation signal in the above period of time, the control module resets the output power of the transmitter.

In an embodiment of the present invention, the transmitter includes an adjustable voltage source. The adjustable voltage source is coupled to the control module, and the output voltage of the adjustable voltage source may be adjusted based on the control signal. In another embodiment, the transmitter includes an adjustable current source. The adjustable current source is coupled to the control module, and the output current of the adjustable current source may be adjusted based on the control signal.

From another aspect, the present invention provides a power saving method of a transceiver device. The transceiver device includes a transmitter for outputting a transmission signal. The power saving method of a transceiver device includes estimating the attenuation value caused when a signal passes through the transmission path. Moreover, when the attenuation value is smaller than a default value, the output power of the transmitter is adjusted to be lower.

The present invention estimates the attenuation value caused when the signal passes through the transmission path. Moreover, when the attenuation value is smaller than a default value, the output power of the transmitter of the transceiver device is adjusted to be lower. Thereby, the power consumption of the transceiver device is decreased.

In order to make the aforementioned and other objectives, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
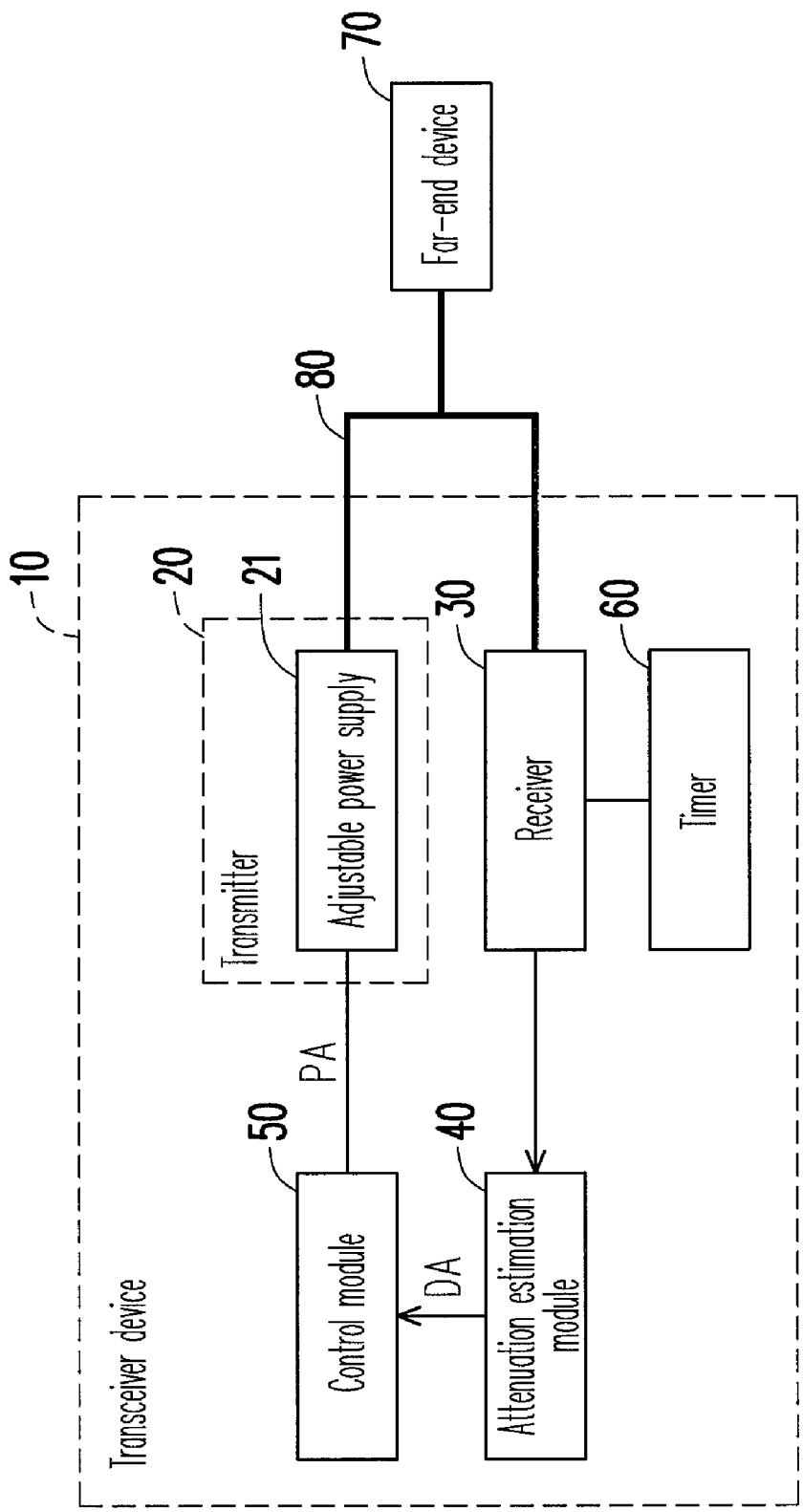
FIG. 1 is a schematic view of a transceiver device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In the prior art, the output power of the transmitter is required to comply with the standard prescribed by IEEE, thus the transmitter may consume a large amount of power. In view of this, the embodiment of the present invention provides a power saving technique of a transceiver device. The attenuation value caused when the signal passes through the transmission path is estimated, and when the attenuation value is smaller than a default value, the output power of the transmitter is adjusted to be lower. Therefore, the power consumption of the transmitter is decreased, so as to save power. Hereinafter a further illustration is given with reference to the drawings.

FIG. 1 is a schematic view of a transceiver device according to an embodiment of the present invention. Referring to FIG. 1, in this embodiment, the transceiver device 10 includes a transmitter 20, a receiver 30, an attenuation estimation module 40, a control module 50, and a timer 60. Moreover, the transmitter 20 includes an adjustable power supply 21. The transceiver device 10 may communicate with a far-end device 70 via a transmission path 80. The transmission path 80 is, for example, a transmission line, the far-end device 70 is, for example, a far-end transceiver device, and the far-end device 70 in other embodiments may also be other communication equipment. Moreover, the adjustable power supply 21 in this embodiment is illustrated as an adjustable voltage source for example, and the output voltage of the adjustable voltage source may be adjusted according to a power adjustment signal PA.

In this embodiment, the adjustable power supply 21 of the transmitter 20 is coupled to the transmission path 80 and the control module 50. The receiver 30 is coupled to the transmission path 80, the timer 60, and the attenuation estimation module 40. The attenuation estimation module 40 is coupled to the control module 50. The transmitter 20 is used to output a transmission signal. More specifically, the transmitter 20 may transmit a signal to the far-end device 70 via the transmission path 80. The receiver 30 is used to receive the transmission signal outputted by the far-end device 70. Moreover, in this embodiment, since the transceiver device 10 and the far-end device 70 adopt a full duplex transmission manner, when the transmitter 20 outputs a transmission signal to the far-end device 70, the receiver 30 may receive an echo signal derived from the transmission signal.

Further, the timer 60 is used to time a period of time for the reference of the receiver 30. The attenuation estimation module 40 is used to estimate an attenuation value DA caused when the signal passes through the transmission path 80. The control module 50 may generate a power adjustment signal PA according to the attenuation value DA, thereby adjusting the adjustable power supply 21.

Figure 2:
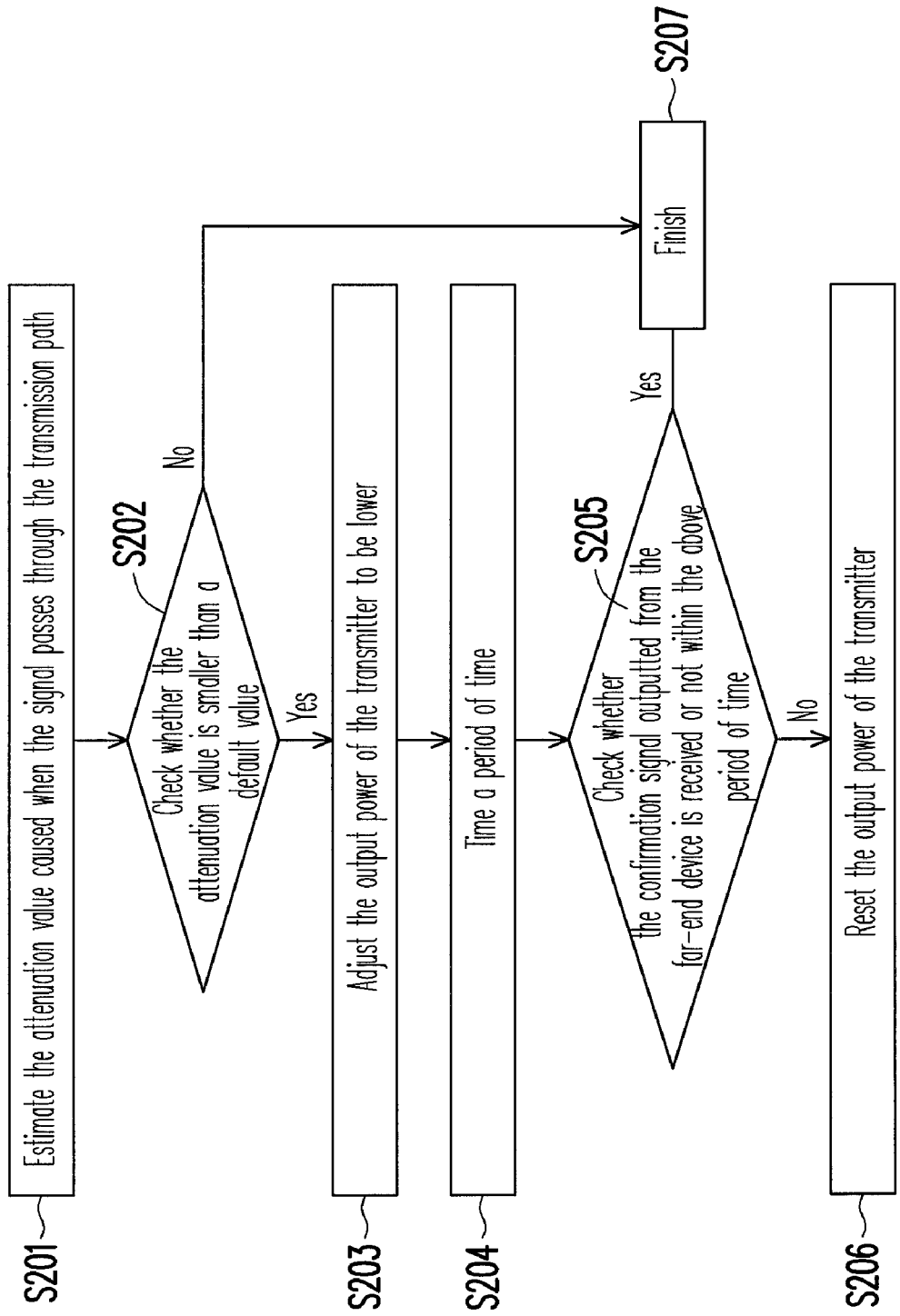
FIG. 2 is a flow chart of processes of a power saving method of a transceiver device according to an embodiment of the present invention.
Figure 3:
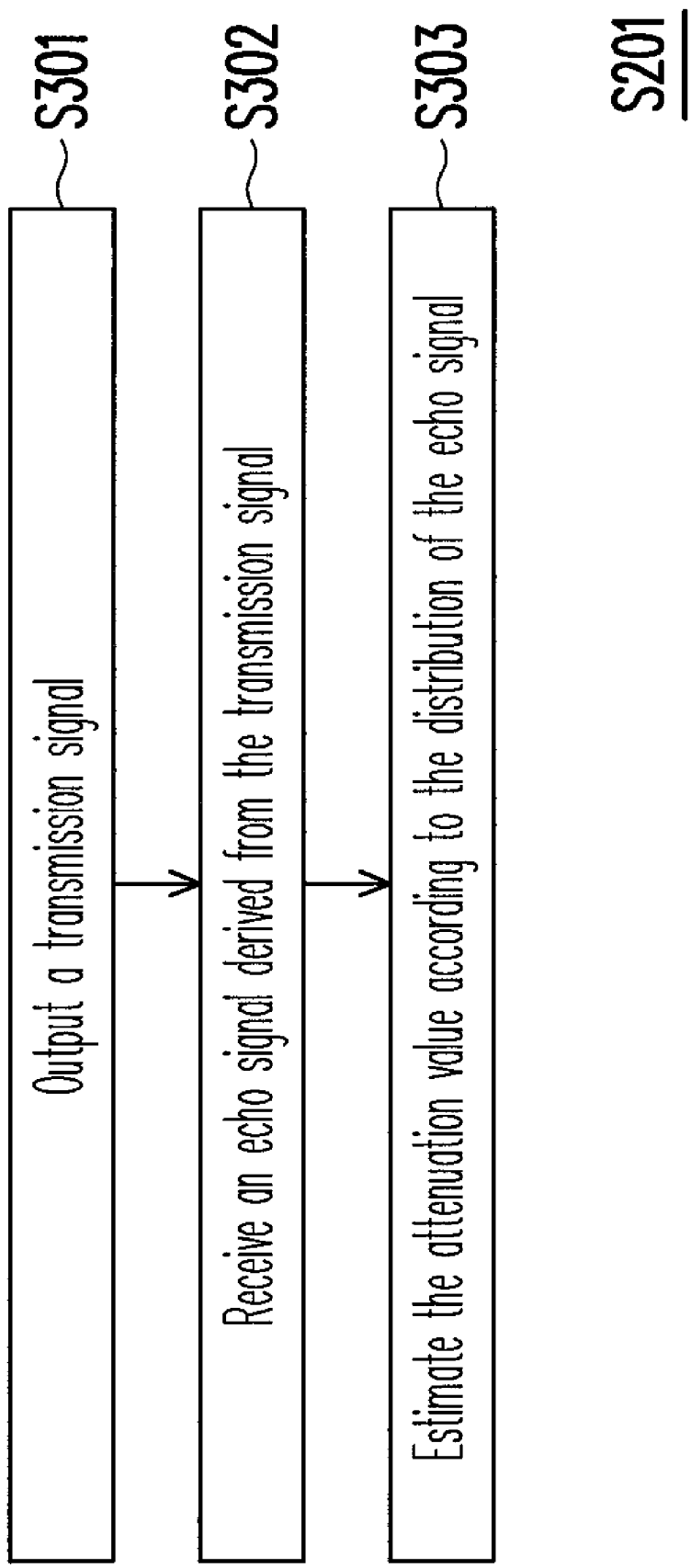
FIG. 3 is flow chart of processes of estimating an attenuation value caused when a signal passes through a transmission path according to an embodiment of the present invention.

FIG. 2 is a flow chart of processes of a power saving method of a transceiver device according to an embodiment of the present invention. FIG. 3 is flow chart of processes of estimating an attenuation value caused when a signal passes through a transmission path according to an embodiment of the present invention. Referring to FIG. 1, FIG. 2, and FIG. 3, firstly in Step S201, the attenuation module 40 estimates the attenuation value DA generated when the signal passes through the transmission path 80. In this embodiment, Step 201 includes, for example, Steps S301-S303. Firstly in Step S301, the transmitter 20 may transmit a signal to the far-end device 70 via the transmission path 80. Then in Step S302, the receiver 30 receives the echo signal derived from the transmission signal.

After that, in Step S303, the attenuation estimation module 40 may estimate the attenuation value based on the distribution of the echo signal. For example, firstly the length of the transmission path 80 is deduced from the distribution of the echo signal, and then the attenuation value DA is estimated based on the length of the transmission path 80. Hereinafter, a further illustration is given.

The transmission speed of the signal in the transmission path 80 is known. Moreover, the time point when the transmitter 20 outputs the transmission signal is known. Furthermore, the time point when the receiver 30 receives the far-end echo signal may also be known based on the distribution of the echo signal, the far-end echo signal is an echo signal derived when the transmission signal is transmitted to the far-end device. Based on the above conditions, the above time difference is multiplied by the above transmission speed and then divided by 2, so as to obtain a value similar to the length of the transmission path 80.

Based on the above, this embodiment may employ the timer 60 to obtain the time difference between outputting the transmission signal and receiving the far-end echo signal. Then, the attenuation estimation module 40 may estimate the length of the transmission path 80 according to the time difference between outputting the transmission signal and receiving the far-end echo signal. With the increase of the length of the transmission path 80, the attenuation value caused when the signal is transmitted in the transmission path 80, i.e., the attenuation value DA, will be increased accordingly. Therefore, the attenuation estimation module 40 may estimate the attenuation value DA according to the distribution of the echo signal.

In addition, this embodiment utilizing Steps S301-S303 to implement Step S201 is advantageous in that, the transceiver device 10 and the far-end device 70 may both estimate the attenuation value DA individually. The transceiver device 10 may estimate the attenuation value DA without considering the signal outputted by the far-end device 70. Likewise, the far-end device 70 may estimate the attenuation value DA without considering the signal outputted by the transceiver device 10.

It should be noted that, the aforementioned implementation is merely an optional embodiment of Step S303, and in other embodiments, persons skilled in the art may also implement Step S303 in other manners as demanded.

Referring to FIG. 1 and FIG. 2 again, Step S202 may be executed after Step S201, and the control module 50 may check whether the attenuation value DA is smaller than the default value. Persons skilled in the art may set the default value as demanded, and the present invention is not limited. When the attenuation value DA is smaller than the default value, it indicates that the signal is not easily interfered by noise when passing through the transmission path 80, thereby Step S203 is executed thereafter, the control module 50 outputs a power adjustment signal PA to control the power of the adjustable power supply 21, thereby adjusting the output power of the transmitter 20 to be lower. For example, the output power of the transmitter 20 is adjusted to be 90% of the output power prescribed by IEEE. Thereby, the power consumption of the transmitter 20 is saved without affecting the signal transmission between the transceiver device 10 and the far-end device 70.

On the other aspect, if the attenuation value DA is greater than the default value, it indicates that the signal is easily interfered by noises when passing through the transmission path 80, thus the output power of the transmitter 20 is not suitable to be adjusted to be lower. Therefore, Step S207 is executed thereafter, and the process is finished.

In addition, in order to avoid the situation that the far-end device 70 cannot receive the transmission signal outputted by the transceiver device 10 after the output power of the transmitter 20 is adjusted to be lower, Steps S204-S206 are employed to determine whether the far-end device 70 can receive the transmission signal outputted by the transceiver device 10 normally or not.

Firstly, the transmitter 20 outputs a transmission signal to the far-end device 70 and the timer 60 starts to time a period of time (Step S204). Then in Step S205, the receiver 30 checks whether the confirmation signal outputted by the far-end device 70 is received or not within the above period of time, and the confirmation signal is used to indicate that the far-end device 70 can receive the transmission signal correctly. In this embodiment, the confirmation signal is, for example, the far-end device 70 changing a coding manner of the output signal.

Moreover, if the receiver 30 receives the confirmation signal of the far-end device 70 within the above period of time, Step S207 is executed, and the process is finished. If the receiver 30 does not receive the confirmation signal of the far-end device 70 within the above period of time, Step S206 is executed again, and the output power of the transmitter 20 is reset, for example, the output power of the transmitter 20 may be returned to the output power prescribed by IEEE. Thereby, the situation that the far-end device 70 cannot receive the transmission signal outputted by the transceiver device 10 after the output power of the transmitter 20 is adjusted to be lower in Step S202 may be avoided. By means of Steps S201-S207 in this embodiment, the transceiver device 10 may make the transmitter 20 output the transmission signal at an appropriate output power, so as to alleviate the power waste for the transmitter in the prior art complying with the standard prescribed by IEEE.

It should be noted that, Steps S201 and S202 in this embodiment may be executed during the auto negotiation between the transceiver device 10 and the far-end device 70, but the present invention is not limited to this. In other embodiments, Steps S201 and S202 may also be executed before the transceiver device 10 transmits consecutive signals to the far-end device 70.

Although the above embodiment has shown a possible aspect of the transceiver device and the power saving method thereof, persons of ordinary skill in the art may know that, different manufacturer have different designs for the transceiver device and the power saving method, therefore, the present invention is not intended to limit the possible aspects. In order words, as long as estimating the attenuation value caused when the signal passes through the transmission path, and adjusting the output power of the transmitter of the transceiver device to be lower when the attenuation value is smaller than the default value, the spirit of the present invention is satisfied. Hereinafter some other embodiments are illustrated for persons of ordinary skill in the art to further understand the spirit of the present invention, and thereby implementing the present invention.

Referring to FIG. 1, in the above embodiment, the adjustable voltage source is taken as an example for illustrating the adjustable power supply 21, but is not used to limit the present invention. In other embodiments, the adjustable power supply 21 may also be the adjustable current source. The control module 40 may adjust the output current of the adjustable current source based on the power adjustment signal PA, thereby also achieving a similar efficacy as the above embodiment.

Furthermore, in the above embodiment, the transmission line is taken as an example for illustrating the transmission path 80, but is not used to limit the present invention. In other embodiments, a wireless transmission may also be adopted between the transceiver device 10 and the far-end device 70. In other words, the transmission path 80 may also be an unguided media, which is also referred to as a wireless communication medium.

Referring to FIG. 1 and FIG. 2 again, in the above embodiment, Step S202 of adjusting the output power of the transmitter 20 to be 90% of the output power prescribed by IEEE is merely an optional embodiment, and is not used to limit the present invention. In other embodiments, persons skilled in the art may decide the range of adjusting the output power of the transmitter 20 as demanded, such as 95%, 85%, 80%, 75%, 70% . . . etc. of the output power prescribed by IEEE.

Moreover, Step S206 of returning the output power of the transmitter 20 to be the output power prescribed by IEEE is merely an optional embodiment, but is not used to limit the present invention. In other embodiments, Step S206 may also be appropriately adjusting the output power of the transmitter 20 to be higher, and maintaining the output power of the transmitter 20 lower than that prescribed by IEEE, then Steps S204-S206 are repeated, thereby achieving the similar efficacy as the above embodiment.

Figure 4:
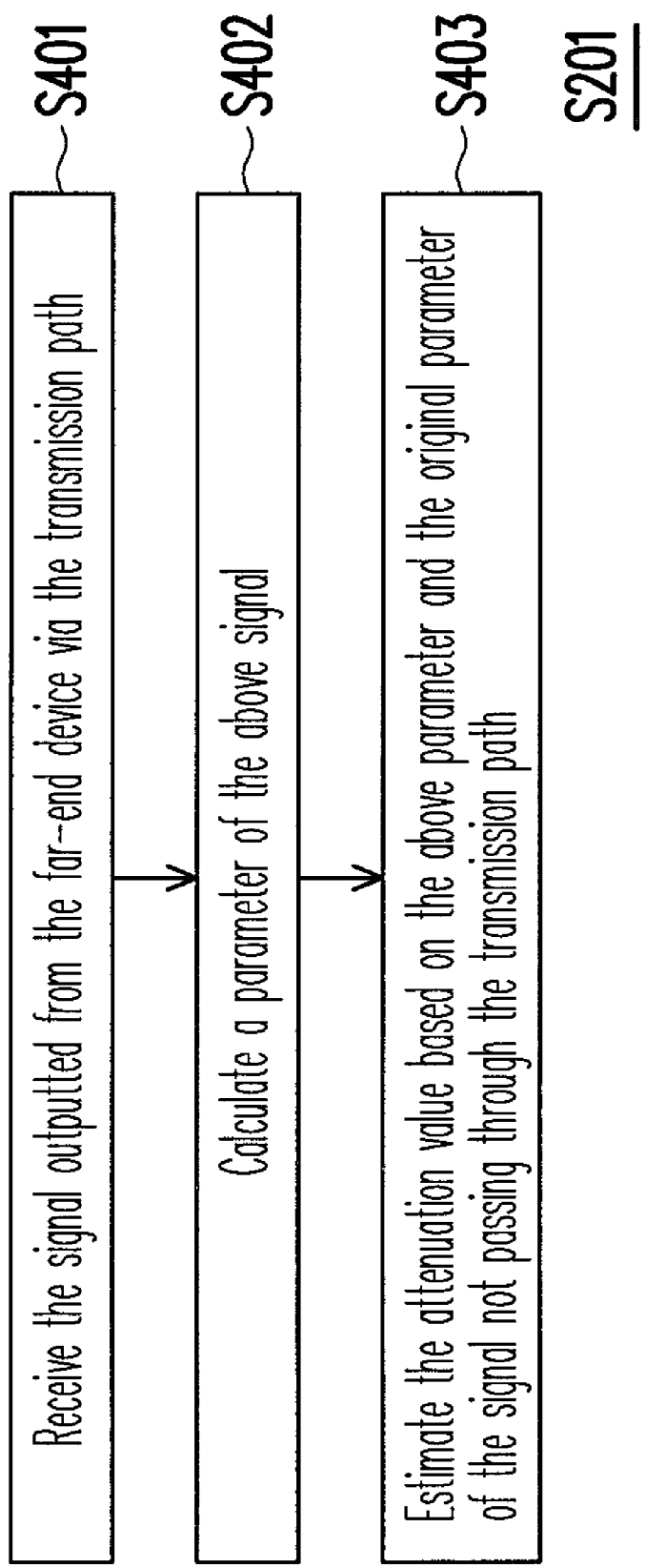
FIG. 4 is flow chart of processes of estimating an attenuation value caused when a signal passes through a transmission path according to another embodiment of the present invention.

In the above embodiment, Step S201 includes, for example, Steps S301-S303, the present invention is not limited to this. In other embodiments, persons skilled in the art may implement Step S201 in other manners. For example, FIG. 4 is flow chart of processes of estimating an attenuation value caused when a signal passes through a transmission path according to another embodiment of the present invention. Referring to FIG. 1, FIG. 2, and FIG. 4, Step S201 may also include Step S401-S403. Hereinafter, a detailed description is given.

Firstly, the far-end device 70 outputs a transmission signal to the receiver 30. In other words, the receiver 30 receives the transmission signal outputted by the far-end device 70 via the transmission path 80 (Step S401). Then, in Step S402, the attenuation estimation module 40 calculates a parameter of the above transmission signal, such as an intensity, a signal-to-noise ratio (SNR), a power, or a combination thereof. After that, in Step S403, the attenuation value DA is estimated based on the parameter obtained in Step S402 and the original parameter of the transmission signal not passing the transmission path 80, and the original parameter is corresponding to the parameter obtained in Step S402, thereby achieving the similar efficacy as the above embodiment.

It should be noted that, if knowing the parameter of the transmission signal outputted by the far-end device 70, the transceiver device 10 may estimate the attenuation value DA. Likewise, if knowing the parameter of the transmission signal outputted by the far-end device 70, the far-end device 70 may estimate the attenuation value DA. In other words, both the transceiver device 10 and the far-end device 70 can estimate the attenuation value DA through Steps S401-S403.

Based on the above, the present invention estimates the attenuation value caused when the signal passes through the transmission path. When the attenuation value is smaller than the default value, the output power of the transmitter of the transceiver device is adjusted to be lower. Therefore, the power consumption of the transmitter is decreased. Moreover, the embodiments of the present invention at least have the following advantages.

1. After the output power of the transceiver device is adjusted to be lower, Steps S204-S206 are executed to ensure that the far-end device can receive the transmission signal outputted by the transceiver device correctly.

2. When the far-end device cannot receive the transmission signal outputted by the transceiver device correctly, the output power of the transceiver device may be appropriately adjusted to be higher to ensure that the far-end device can receive the transmission signal outputted by the transceiver device correctly, and maintain the output power of the transceiver device lower than that the standard prescribed by IEEE, thereby achieving the power saving efficacy.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. A transceiver device, suitable for an Ethernet network, the transceiver device comprising: an attenuation estimation module, coupled to a transmission path, for estimating an attenuation value caused when a signal passes through the transmission path, wherein a signal is outputted from a far-end device through the transmission path, and the far-end device changes a coding manner of the signal according to a receiving capacity of the far-end device; a transmitter, coupled to the transmission path, for outputting a transmission signal; and a control module, coupled to the attenuation estimation module and the transmitter, for adjusting an output power of the transmitter to be lower when the attenuation value is smaller than a default value; and a timer, for timing a period of time; and a receiver, coupled to the transmission path, the timer, and the control module, for checking whether a confirmation signal outputted from the far-end device is received or not in the above period of time, wherein the confirmation signal indicates that the far-end device can receive the transmission signal correctly, when the receiver does not receive the confirmation signal in the above period of time, the control module resets the output power of the transmitter.

2. The transceiver device according to claim 1, further comprising:
a receiver, coupled to the transmission path, for receiving the signal outputted from the far-end device through the transmission path;
wherein the attenuation estimation module calculates a parameter of the signal, and compares the parameter with an original parameter of the signal not passing through the transmission path, thereby estimating the attenuation value.

3. The transceiver device according to claim 2, wherein the parameter comprises an intensity, a signal-to-noise ratio (SNR), a power, or a combination thereof, and the original parameter is corresponding to the parameter.

4. The transceiver device according to claim 1, wherein the transmitter comprises:
an adjustable voltage source, coupled to the control module, wherein an output voltage of the adjustable voltage source is adjusted based on the control signal.

5. The transceiver device according to claim 1, wherein the transmitter comprises:
an adjustable current source, coupled to the control module, wherein an output current of the adjustable current source is adjusted based on the control signal.

6. A power saving method of a transceiver device, wherein the transceiver device comprises a transmitter for outputting a transmission signal, the method comprising: estimating an attenuation value caused when a signal passes through a transmission path; and adjusting an output power of the transmitter to be lower when the attenuation value is smaller than a default value, wherein the step of estimating the attenuation value caused when the signal passes through the transmission path comprises: receiving a signal outputted from a far-end device through the transmission path, wherein the far-end device changes a coding manner of the signal according to a receiving capacity of the far-end device; calculating a parameter of the signal; and estimating the attenuation value according to the parameter and an original parameter of the signal not passing through the transmission path; and timing a period of time; checking whether a confirmation signal outputted from a far-end device is received or not in the period of time, wherein the confirmation signal indicates that the far-end device can receive the transmission signal correctly; and resetting the output power of the transmitter if the confirmation signal is not received in the period of time.

7. The power saving method of a transceiver device according to claim 6 wherein the parameter comprises an intensity, a signal-to-noise ratio (SNR), a power, or a combination thereof, and the original parameter is corresponding to the parameter.

* * * * *